United States Patent
Kong

(10) Patent No.: US 8,194,652 B2
(45) Date of Patent: Jun. 5, 2012

(54) SERIALIZER FOR GENERATING SERIAL CLOCK BASED ON INDEPENDENT CLOCK SOURCE AND METHOD FOR SERIAL DATA TRANSMISSION

(75) Inventor: Jaesop Kong, Gwacheon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1404 days.

(21) Appl. No.: 11/360,884

(22) Filed: Feb. 23, 2006

(65) Prior Publication Data

US 2006/0193347 A1 Aug. 31, 2006

(30) Foreign Application Priority Data

Feb. 28, 2005 (KR) .................. 10-2005-0016607

(51) Int. Cl.
*H04L 12/50* (2006.01)
(52) U.S. Cl. ................... 370/366; 370/503
(58) Field of Classification Search ............ 307/11, 307/36, 37; 341/50, 100, 101; 370/351, 370/357, 360, 366, 431, 462, 112, 506; 708/100, 708/200, 490, 670, 680, 681, 682, 700, 705, 708/706; 710/1, 62, 65, 71
See application file for complete search history.

(56) References Cited

U.S. PATENT DOCUMENTS

| | | | | |
|---|---|---|---|---|
| 4,965,797 A * | 10/1990 | Yamane et al. | | 370/537 |
| 5,420,844 A * | 5/1995 | Kawakubo et al. | | 369/59.15 |
| 5,619,506 A * | 4/1997 | Burch et al. | | 370/506 |
| 5,990,813 A * | 11/1999 | Ten Eyck | | 341/100 |
| 6,107,946 A * | 8/2000 | Jeong | | 341/101 |
| 6,449,315 B2 * | 9/2002 | Richards | | 375/282 |
| 7,113,702 B2 * | 9/2006 | Yamada et al. | | 398/79 |
| 2001/0033188 A1 * | 10/2001 | Aung et al. | | 327/141 |
| 2003/0177429 A1 * | 9/2003 | Hessel et al. | | 714/751 |
| 2004/0080671 A1 | 4/2004 | Siemens et al. | | |
| 2004/0136402 A1 | 7/2004 | Ozawa | | |

FOREIGN PATENT DOCUMENTS

| | | |
|---|---|---|
| JP | 0706708 7 | 10/1995 |
| JP | 2004-348633 | 12/2004 |

* cited by examiner

*Primary Examiner* — Steven H Nguyen
*Assistant Examiner* — Syed M Bokhari
(74) *Attorney, Agent, or Firm* — F. Chau & Associates, LLC

(57) ABSTRACT

A method for serially transmitting data from a system including a serializer for converting a parallel data signal into a serial data signal and a parallelizer for converting the serial data signal into the parallel data signal includes storing a value of the parallel data signal in a register in the parallelizer, generating a serial clock signal independent from a clock signal of the parallel data signal using an external clock source, and recovering the parallel data signal by using the value of the parallel data signal stored in the register.

28 Claims, 4 Drawing Sheets

SERIALIZER FOR GENERATING SERIAL CLOCK BASED ON INDEPENDENT CLOCK SOURCE AND METHOD FOR SERIAL DATA TRANSMISSION

BACKGROUND OF THE INVENTION

This application claims the priority of Korean Patent Application No. 10-2005-16607, filed on 28 Feb. 2005, in the Korean Intellectual Property Office.

1. Field of the Invention

The present invention relates to a data transmission method and a system for performing the data transmission method, and more particularly, to a serial data transmission method and a serializer for performing the serial data transmission method.

2. Description of the Related Art

With the development of electronic and computer technologies, communication between different devices is increasingly important. High-speed communication is needed between different chips on a circuit board, circuit boards in a system, and different systems. An important problem in the communication between devices is the simplification of transmission lines used as data flow lines between the devices. To simplify transmission lines and enhance reliability of communication signals, sending devices convert parallel data signals into serial data signals and then transmit the serial signals, and receiving devices convert the serial data signals into parallel data signals for further processing.

A device for converting parallel data signals into serial data signals is called a serializer, and a device for converting serial data signals into parallel data signals is called a parallelizer.

FIG. 1 is a schematic block diagram illustrating a method for communicating data between communication terminals. In FIG. 1, a first communication terminal 10 and a second communication terminal 20 are devices for parallel data processing. A serializer 30 and a parallelizer 40 are provided between the first communication terminal 10 and the second communication terminal 20.

Referring to FIG. 1, the first communication terminal 10 transmits, in parallel, a sync signal Sync1, data clock signal CLK1, and n data signals DATA1 through corresponding bus lines. The sync signal Sync1 and the data clock signal CLK1 are used to synchronize transmission times and reception times of data transmitted to the serializer 30. To transmit the n data signals DATA1 from the first communication terminal 10 to the serializer 30, n data bus lines are needed. Here, "n" is the number of data signals that are to be simultaneously transmitted from the first communication terminal 10 to the serializer 30. The serializer 30 receives the parallel data signals and converts them into serial data signals. When the data signals, transmitted from the first communication terminal 10 through n data bus lines to the serializer 30, are transmitted through a single data bus line, a serial clock signal S-CLK is needed. The serial clock signal S-CLK is generated by a phase locked loop (PLL) 31 of the serializer 30. The PLL 31 receives the clock signal CLK1 from the first communication terminal 10 and outputs the serial clock signal S-CLK. If a frequency representing the number of data bits transmitted per hour of the clock signal CLK1 is assumed to be f1, the serial clock signal S-CLK must have n times the frequency of f1. To transmit n data bits over a serial data signal S-DATA, the frequency of the serial clock signal S-CLK representing the number of data bits transmitted per hour must be n times the frequency of the clock signal CLK1.

The serial data signal S-DATA and the serial clock signal S-CLK are inputted to the parallelizer 40. The parallelizer 40 converts the serial data signal S-DATA into parallel data signals suitable for the second communication terminal 20 according to the clock signal S-CLK. Using the serial clock signal S-CLK, the parallelizer 40 generates a clock signal CLK2, a frequency of which is equal to the frequency (f1) of the clock signal CLK1 outputted from the first communication terminal 10. The parallelizer 40 recovers the n data signals DATA2 based on the clock signal CLK2, and transmits in parallel the data signals DATA2 to the second communication terminal 20.

In the method for communicating data between communication terminals, the serial clock signal S-CLK for the serial data communication is generated using the clock signal CLK1 outputted from the first communication terminal 10. If the first communication terminal 10 temporarily stops its operation, for example, so as to reduce power consumption of the system, the generation of the clock signal CLK1 is also stopped temporarily and thus a stable serial clock signal S-CLK cannot be obtained. In addition, after generation of the clock signal CLK1 is resumed from the first communication terminal 10, serial data transmission is delayed by a stabilization time so as to obtain a stable serial clock signal S-CLK.

Therefore, a need exists for a serial data transmission method and a serializer therefore using an independent clock.

SUMMARY OF THE INVENTION

According to an embodiment of the present invention, a serializer generates a serial clock on the basis of an independent clock source. A method for serial data transmission simultaneously transmits data having different clock frequency characteristics by using a serial data signal in synchronization with the independent clock source.

According to an embodiment of the present invention, a first communication terminal outputs one or more parallel data signals and a given clock signal. An external clock source generates a reference clock signal. A serializer for generating a serial clock signal and converting the parallel data signals received from the first communication terminal into one serial data signal, the serial clock being independent of the given clock signal and in synchronization with the reference clock signal.

According to an embodiment of the present invention, a system for serially transmitting data includes a first communication terminal, an external clock source, a serializer, and a parallelizer. The first communication terminal outputs one or more parallel data signals and a given clock signal. The external clock source generates a reference clock signal. The serializer generates a serial clock signal and converts the parallel data signals received from the first communication terminal into one serial data signal, the serial clock being independent of the given clock signal and in synchronization with the reference clock signal. The parallelizer receives the serial data signal and the serial clock signal from the serializer to recover a parallel data signal, a parallel clock signal, and a synchronization signal.

According to an embodiment of the present invention, a system includes a serializer for converting a parallel data signal into a serial data signal and a parallelizer for converting the serial data signal into the parallel data signal. A value of the parallel data signal is stored in a register in the parallelizer. A serial clock signal independent from data transmitted is generated using an external clock source. A parallel data signal is recovered using the stored value of the parallel data signal in the register.

BRIEF DESCRIPTION OF THE DRAWINGS

The accompanying drawings illustrate embodiment(s) of the present invention. In the drawings.

DETAILED DESCRIPTION OF PREFERRED EMBODIMENTS

Reference will now be made in detail to preferred embodiments of the present invention, examples of which are illustrated in the accompanying drawings. However, the present invention is not limited to embodiments illustrated herein after. Embodiments are rather introduced to provide easy and complete understanding of the scope and spirit of the present invention.

Figure 1:
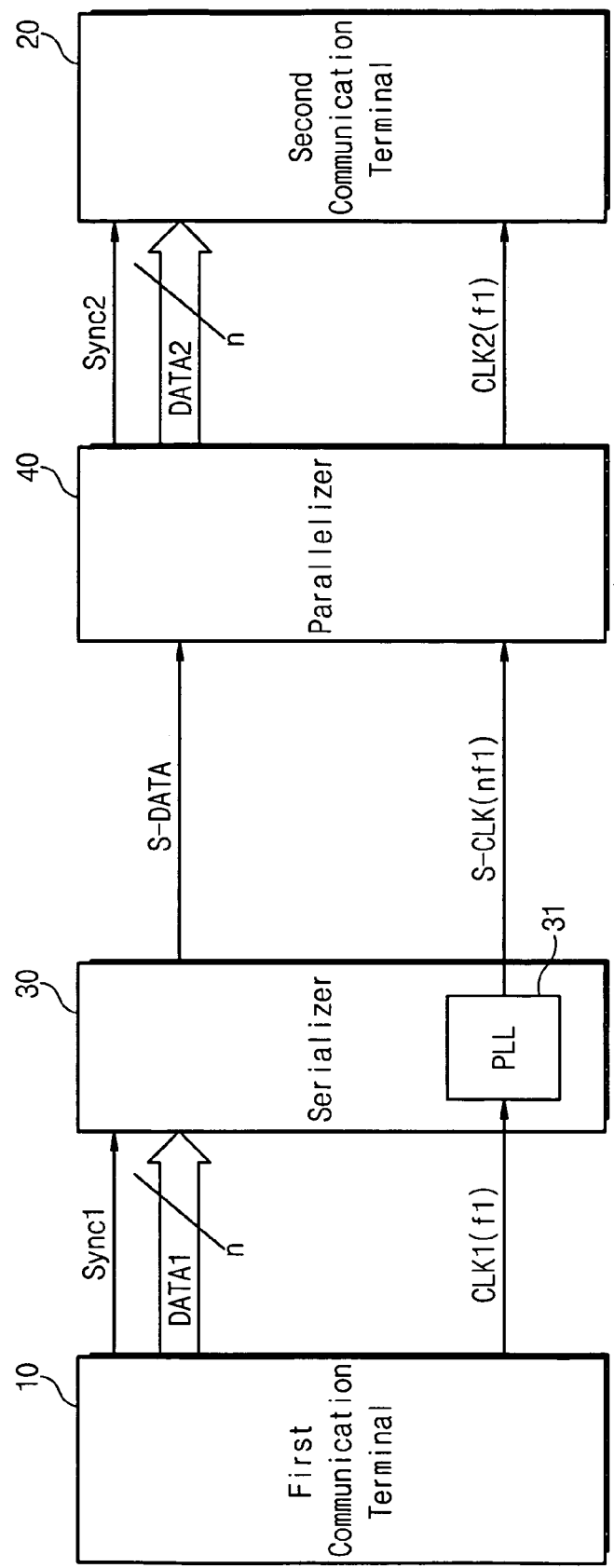
FIG. 1 is a schematic block diagram illustrating a method for communicating data between communication terminals.
Figure 2:
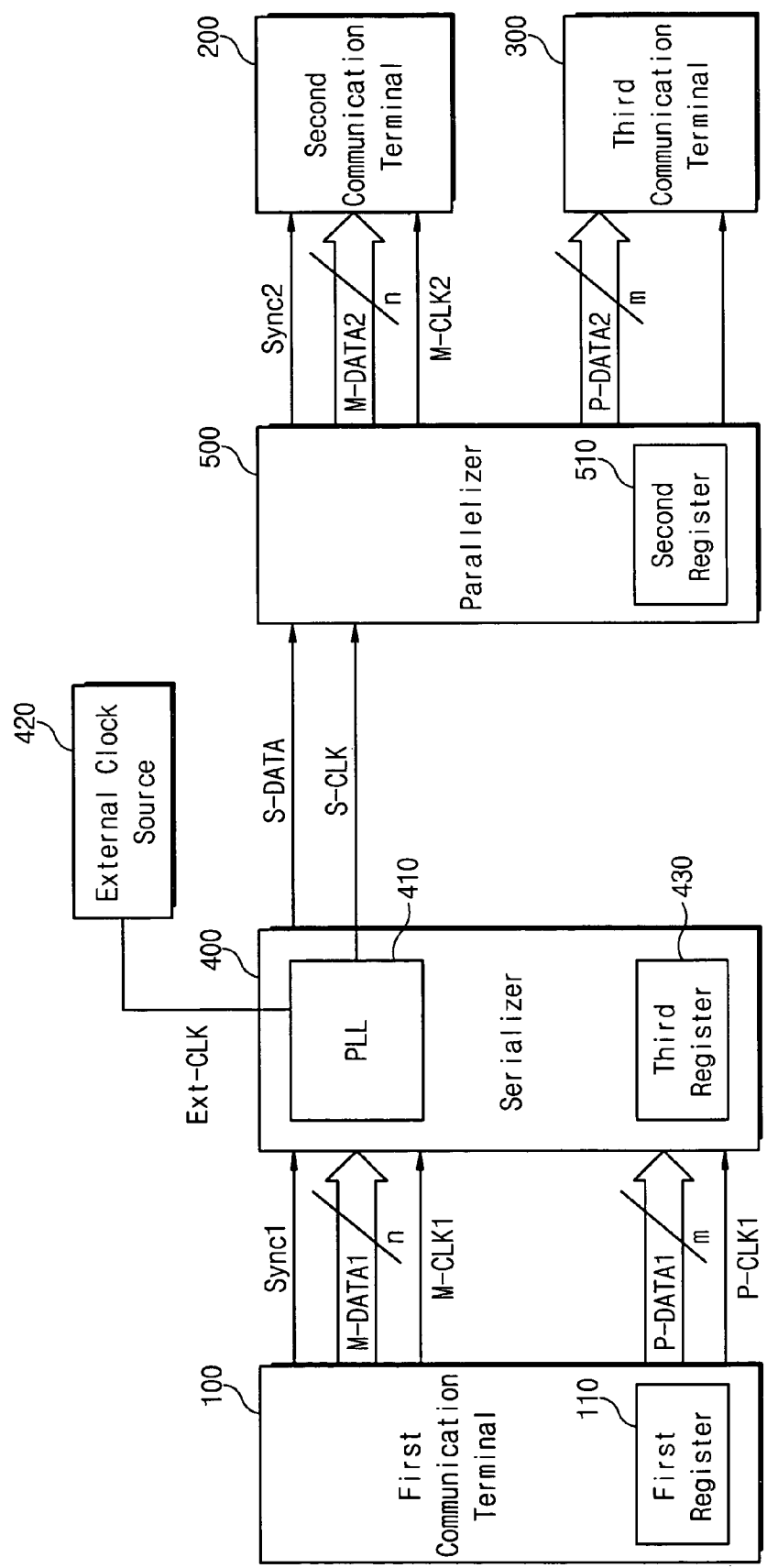
FIG. 2 is a schematic block diagram illustrating a method for communicating data between communication terminals according to an embodiment of the present invention.

FIG. 2 is a schematic block diagram illustrating a method for communicating data between communication terminals according to an embodiment of the present invention.

Referring to FIG. 2, a serializer 400 converts a parallel data signal into a serial data signal and a parallelizer 500 converts the serial data signal into a parallel data signal. The serializer 400 and parallelizer 500 are used in serially transmitting a data signal from a first communication terminal 100 to a second communication terminal 200 and a third communication terminal 300.

A multimedia data signal M-DATA1, which is transmitted from the first communication terminal 100 to the second communication terminal 200, represents a data signal, such as a video data signal that contains a synchronization signal Sync1 and needs a data transmission timing operation. A parallel data signal P-DATA1, which is transmitted from the first communication terminal 100 to the third communication terminal 300, represents a data signal that does not have a synchronization signal and has only to be transmitted within a predetermined duration. The parallel data transmission may be performed in a synchronous mode needing a parallel clock signal P-CLK1, or in an asynchronous mode not needing the parallel clock signal P-CLK1.

The first communication terminal 100 includes a first register 110 for storing information about clock/sync signals and a valid period of the multimedia data signal M-DATA1 that are outputted from the first communication terminal 100. The first communication terminal 100 transmits parallel signals through respective bus lines. Here, the parallel signals include the synchronization signal Sync1 for adjusting the transmission and reception time points of the multimedia data signal M-DATA1, n multimedia data signals such as video data, a multimedia clock signal M-CLK1, and m parallel data signals P-DATA1. The transmission timing of the m parallel data signals P-DATA1 is not important.

n data bus lines are needed for transmitting the n multimedia data signals M-DATA1 from the first communication terminal 100 to the serializer 400. Likewise, m data bus lines are needed for transmitting the m parallel data signals P-DATA1 from the first communication terminal 100 to the serializer 400. Here, "n" and "m" correspond to the number of data signals that are to be simultaneously transmitted from the first communication terminal 100 to the serializer 400.

The multimedia clock signal M-CLK1 and the parallel clock signal P-CLK1 output from the first communication terminal 100 may be temporarily stopped so as to reduce the power consumption of the system.

The serializer 400 converts the parallel signals from the first communication terminal 100 into a serial signal. A serial clock signal S-CLK is generated for transmitting the n multimedia data signals M-DATA, the synchronization signal Sync1, and the m parallel data signals P-DATA1 that have been received at the serializer 400 from the first communication terminal 100 through a serial data line. The serial clock signal S-CLK is generated by a phase locked loop (PLL) 410 of the serializer 400. The PLL 410 generates the serial clock signal S-CLK suitable for serial data transmission on the basis of an external clock source 420.

The PLL 410 generates the serial clock signal S-CLK on the basis of an external clock signal Ext-CLK generated at the external clock source 420. The frequency of the serial clock signal S-CLK is determined according to the multimedia clock signal M-CLK1 and the parallel clock signal P-CLK1. Even when the supply of the multimedia clock signal M-CLK1 and the parallel clock signal P-CLK1 is interrupted, e.g., due to suspension of some operations of the first communication terminal 100 for reducing power consumption of the system, the serializer 400 can stably generate the serial clock signal S-CLK because the PLL 410 generates the serial clock signal S-CLK in synchronization with the external clock signal Ext-CLK. When an operation of the first communication terminal 100 is resumed, the serializer 400 can promptly resume the serial data transmission without the need of a separate clock stabilization time because the PLL 410 generates the serial clock signal S-CLK independent of the multimedia clock signal M-CLK1 and the parallel clock signal P-CLK1.

To simultaneously transmit the synchronization signal Sync1, the multimedia data M-DATA1 and the parallel data P-DATA by using the serial data signal S-DATA, the bandwidth of the serial data signal S-DATA is at least the sum of the bandwidths of the multimedia data M-DATA1 and the parallel data P-DATA1. That is, the frequency of the serial clock signal S-CLK is adjusted according to the bandwidth of a transmitted data.

The parallelizer 500 receives the serial data signal S-DATA and the serial clock signal S-CLK form the serializer 400, and converts the received serial data signals into parallel signals suitable for the input of the second and third communication terminals 200 and 300. To simultaneously transmit the multimedia data M-DATA1 and the parallel data P-DATA1 in the form of the serial data signal S-DATA and then recover the multimedia data M-DATA1 from the serial data signal S-DATA at the parallelizer 500, the parallelizer 500 has a second register 510. The second register 510 stores items that are the same as or a part of items stored in the first register 110 of the first communication terminal 100. Each item in the second register 510 has the same value as the corresponding item in the first register 110 when the first communication terminal 100 is electrically connected to the second communication terminal 200. The value of each item in the first register 110 may be adjusted to improve a characteristic of the transmission and recovery of the multimedia data M-DATA1. For example, when a valid period of the multimedia data between synchronization signals is reduced and the invalid period thereof is increased by increasing the frequency of the multimedia clock signal M-CLK1, the serial data transmission and recovery operations are improved, e.g., reducing the likelihood of timing error, etc. A third register 430 having the same items and values as the first register 110 may be installed in the serializer 400 for the transmission of the multimedia data M-DATA.

Figure 3:
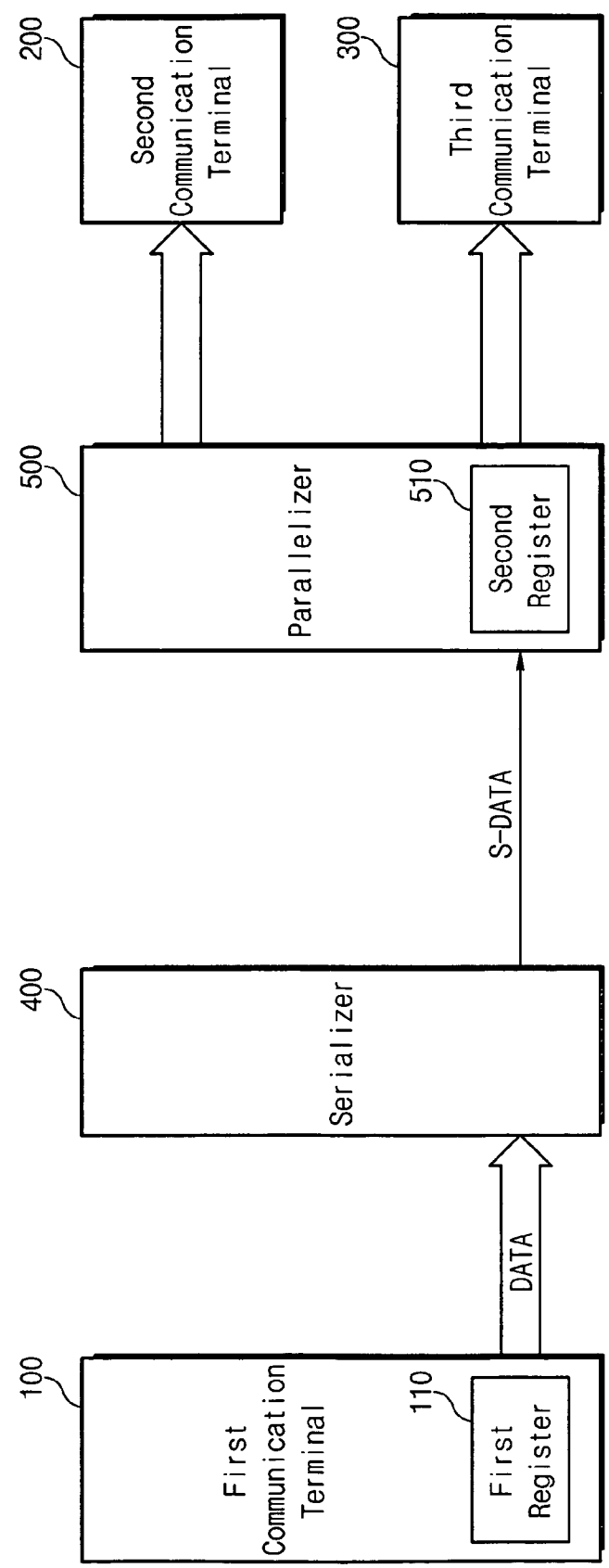
FIG. 3 is a schematic block diagram illustrating a data transmission process using registers.

FIG. 3 is a schematic block diagram illustrating the data transmission between the first register 110 of the first communication terminal 100 and the second register 510 of the parallelizer 500.

Referring to FIG. 3, the first register 110 stores information about the clock/sync signals and the valid period of the multimedia data signal M-DATA1 that are outputted from the first communication terminal 100. The first and second registers 110 and 510 are suitably adjusted before the initiation of data communication among the first, second and third communication terminals 100, 200 and 300, thereby making it possible for the parallelizer 500 to recover the desired data signal.

Figure 4:
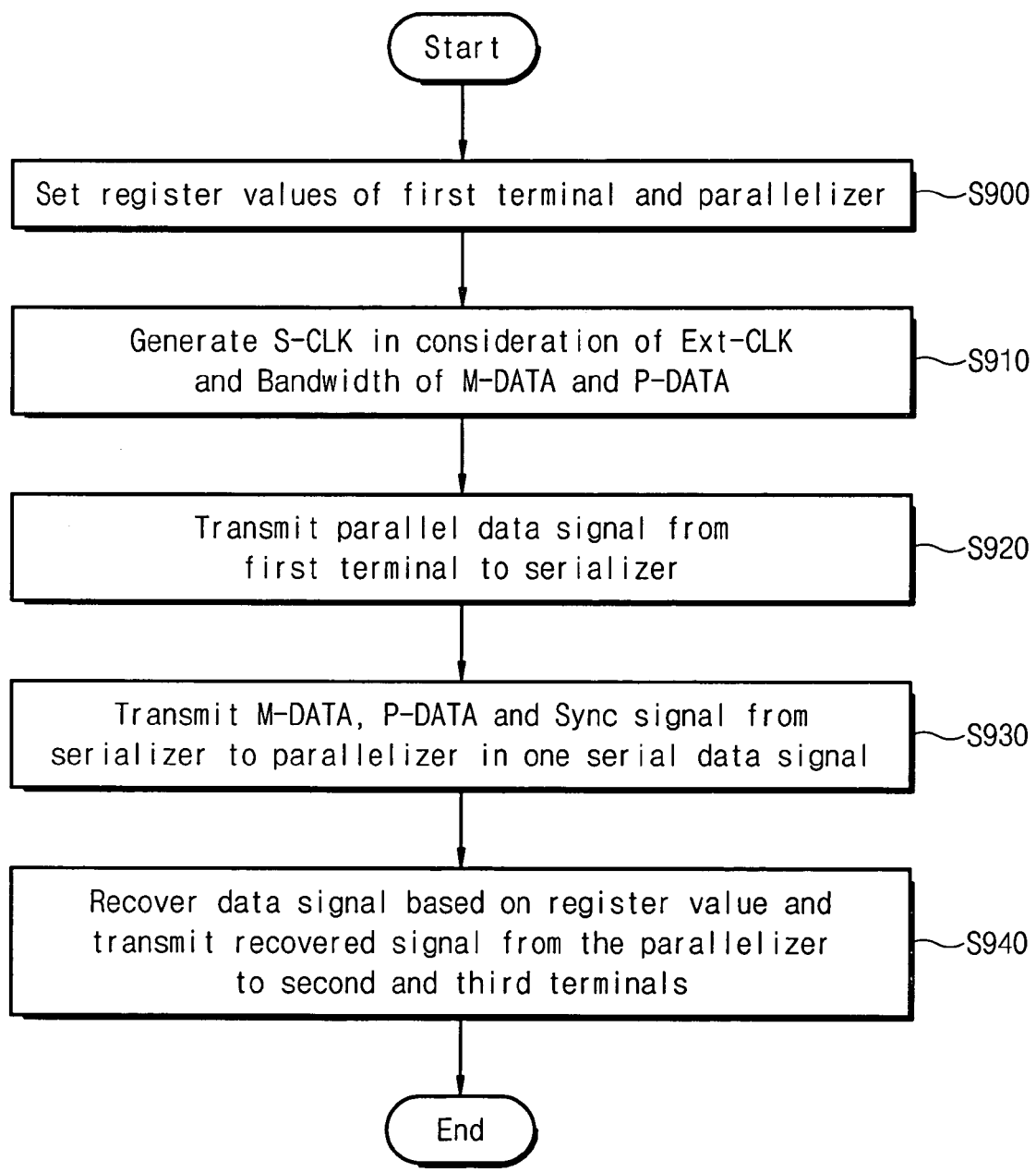
FIG. 4 is a flowchart illustrating a method for transmitting data according to an embodiment of the present invention.

FIG. 4 is a flowchart illustrating a method for data transmission between the first, second and third communication terminals 100, 200 and 300.

Referring to FIGS. 2 through 4, in operation S900, the values of the first and second registers 110 and 510 are suitably adjusted before the initiation of data transmission among the communication terminals 100, 200 and 300. In operation S910, when data transmission is initiated among the communication terminals, the serial clock signal S-CLK is generated on the basis of the external clock signal Ext-CLK of the external clock source 420 in consideration of the bandwidth of the multimedia data signal M-DATA1 and the bandwidth of the parallel data signal P-DATA1. In operation S920, a data signal and a clock signal are transmitted in parallel from the first communication terminal 100 to the serializer 400. In operation S930, the serializer 400 combines the synchronization signal Sync1, the multimedia data signal M-DATA1 and the parallel data signal P-DATA1 into a serial data signal S-DATA, and transmits the combined serial data signal S-DATA1 and the serial clock signal S-CLK to the parallelizer 500. In operation S940, the parallelizer 500 recovers data signals M-DATA2 and P-DATA2, clock signals M-CLK2 and P-CLK2, and a synchronization signal Sync2 on the basis of the information stored in the second register 510, and transmits the recovered signals to the second and third communication terminals 200 and 300.

Transmission of Data/Sync Signals

The first communication terminal 100 transmits the synchronization signal Sync1, the multimedia data signal M-DATA1, the multimedia clock signal M-CLK1, the parallel data signal P-DATA1 and the parallel clock signal P-CLK1 to the serializer 400. The serializer 400 combines the signals received from the first communication terminal 100 to generate the serial data signal S-DATA and the serial clock signal S-CLK.

The time needed for transmission of one synchronization signal Sync1, the time needed for transmission of the multimedia data M-DATA1 between successive synchronization signals Sync1, and the time needed for transmission of the parallel data P-DATA1 between the successive synchronization signals Sync1 may be denoted as "Tsync", "Tm", and "Tp", respectively. The total time needed for transmission of the data between the successive synchronization signals Sync1 of the parallel data signal received by the serializer 400 becomes the sum of "Tsync", "Tm", and "Tp". This total time needs to be smaller than the time difference "Ts" between the successive synchronization signals Sync1. The total time can be secured by generating the serial clock signal S-CLK of a proper frequency at the PLL 410.

The serial data signal S-DATA serves to transmit each synchronization signal Sync1 in the form of a single packet and simultaneously transmits the multimedia data signal M-DATA1 between successive synchronization signals Sync1 in the form of a single packet or several packets. Also, the serial data signal S-DATA serves to transmit the parallel data signal P-DATA1 between the successive synchronization signals Sync1 in the form of a single packet or several packets subsequently to the packet of the multimedia data signal M-DATA1. It is preferable to secure a waiting time "Tw" after transmission of the parallel data signal P-DATA1 by adjusting the length of the parallel data signal P-DATA1, to transmit the next synchronization signal Sync without delay. That is, the sum of Tsync, Tm, Tp and Tw is preferably set to be smaller than Ts. Any omitted parallel data signal P-DATA1 is transmitted after the next synchronization signal Sync1. Because the frequency of the serial clock signal S-CLK has been determined in full consideration of the bandwidth of the parallel data signal P-DATA1, an overflow can be prevented by using a buffer of a suitable size. The transmission of the serial data signal S-DATA1 occurs repeatedly with the synchronization signal Sync1.

Recovery of Data/Sync Signals

Signals inputted into the parallelizer 500 through the serial data signal S-DATA and the serial clock signal S-CLK are recovered into the synchronization signal Sync2, the multimedia data signal M-DATA2, the multimedia clock signal M-CLK2, the parallel data signal P-DATA2 and the parallel clock signal P-CLK2 in consideration of data about clock/sync signals and a valid period of the multimedia data signal M-DATA2 that are stored in the second register 510. The multimedia data signal packet and the parallel data signal packet, which are received at the parallelizer 500 through the serial data signal S-DATA and the serial clock signal S-CLK, are processed independently. On the basis of information about the received multimedia data stored in the second register 510, the synchronization signal Sync2 is first recovered based on the arrival time of the synchronization signal packet and then the multimedia data signal M-DATA2 is recovered from the multimedia data signal packet. The multimedia clock signal M-CLK2 is generated on the basis of the clock data stored in the second register 510. The multimedia clock signal M-CLK2 is corrected whenever the synchronization signal Sync2 is activated, so that a frequency difference is substantially prevented from accumulating between the multimedia clock signal M-CLK1 from the first communication terminal 100 and the multimedia clock signal M-CLK2 from the parallelizer 500. To maintain the number of cycles of the multimedia clock signal M-CLK2 between the successive synchronization signals Sync2, the value of the multimedia clock signal M-CLK2 is maintained until the next synchronization signal Sync2 is activated after a last cycle. The parallel data signal P-DATA2 and the parallel clock signal P-CLK2 are recovered on the basis of information about the received parallel data stored in the second register 510.

As described above, when data are serially transmitted using the serializer and the parallelizer, the serial clock signal is generated using the independent external clock source, thereby making it possible to secure the stable serial clock signal and to prevent the delay of the serial data transmission. The serial clock signal can be generated in consideration of the bandwidth of the inputted data signal and thus the data having different clock frequency characteristics can be simultaneously transmitted through the serial data signal, thereby making it possible to improve the data transmission efficiency.

It will be apparent to those skilled in the art that various modifications and variations can be made in the present invention. Thus, it is intended that the present invention covers the modifications and variations provided they come within the scope of the disclosure and equivalents thereof.

What is claimed is:

1. A system for serially transmitting data, the system comprising:
  a first communication terminal for outputting one or more parallel data signals and one or more clock signals corresponding to the parallel data signals;
  an external clock source for generating a reference clock signal; and
  a serializer for generating a serial clock signal on the basis of the reference clock signal and converting the parallel data signals received from the first communication terminal into one serial data signal, the serial clock being independent of the clock signals,
  wherein when a first parallel data signal and a second parallel data signal in synchronization with different clock frequencies are inputted into the serializer, the serializer generates the serial data signal having a bandwidth wider than a sum of the bandwidth of the first and second parallel data and transferring the first and second parallel data,
  wherein a frequency of the serial clock is adjusted so that the first and second parallel data signals are transmitted in the serial data signal,
  wherein the second parallel data signal is a data signal that has no synchronization signal and is to be transmitted within a predetermined duration, and
  wherein the serializer transmits a synchronization signal in a single packet and transmit the first parallel data signal between successive synchronization signals in the form of a single packet or several packets, and transmits the second parallel data signal between the successive synchronization signals in the form of a single packet or several packets subsequently to the packet of the first parallel data signal.

2. The system of claim 1, wherein the serializer generates the serial clock signal independent from the clock signals and based on the reference clock signal during an interruption of the clock signals.

3. The system of claim 1, wherein the serializer comprises a PLL (phase locked loop) for generating the serial clock signal.

4. The system of claim 1, wherein the first parallel data signal is a video data signal that has the synchronization signal and to be transmitted in synchronization with the synchronization signal.

5. The system of claim 1, wherein the serial data signal outputted from the serializer includes the synchronization signal for representing a constant data transmission period.

6. The system of claim 5, wherein a serial transmission of the first and second parallel data signals is initiated when the synchronization signal is generated, and is completed before the synchronization signal is generated again.

7. The system of claim 1, wherein after transmission of the second parallel data signal, a length of the second parallel data packet is adjusted to transmit the next synchronization signal without delay, to secure a marginal time until the next synchronization signal is inputted, after transmission of the second parallel data packet is completed.

8. The system of claim 7, wherein an omitted data signal among the second parallel data signal is transmitted after the successive synchronization signals.

9. The system of claim 1, further comprising a parallelizer for receiving the serial data signal and the serial clock signal from the serializer to recover the one or more parallel data signals, and the given clock signal, wherein the one or more parallel data signals include the synchronization signal.

10. The system of claim 9, wherein the parallelizer includes a register for storing information about the given clock signal, the synchronization signal and a valid period of a data signal.

11. The system of claim 10, wherein the register individually stores a data signal corresponding to each data signal contained in the serial data signal.

12. The system of claim 11, wherein the parallelizer recovers the parallel data signals, a parallel clock signal, and the synchronization signal by using the data signal stored in the register.

13. A system for serially transmitting data, the system comprising:
  a first communication terminal for outputting one or more parallel data signals and one or more clock signals corresponding to the parallel data signals;
  an external clock source for generating a reference clock;
  a serializer for generating a serial clock signal on the basis of the reference clock signal and converting the parallel data signals received from the first communication terminal into one serial data signal, the serial clock being independent of the clock signals; and
  a parallelizer for receiving the serial data signal and the serial clock signal from the serializer to recover a parallel data signal, a parallel clock signal, and a synchronization signal,
  wherein when a first parallel data signal and a second parallel data signal in synchronization with different clock frequencies are inputted into the serializer, the serializer generates the serial data signal having a bandwidth wider than a sum of the bandwidth of the first and second parallel data and transferring the first and second parallel data,
  wherein a frequency of the serial clock is adjusted so that the first and second parallel data signals are transmitted in the serial data signal,
  wherein the second parallel data signal is a data signal that has no synchronization signal and is to be transmitted within a predetermined duration, and
  wherein the serializer serves to transmit the synchronization signal in a single packet and transmit the first parallel data signal between successive signals in the form of a single packet or several packets, and transmits the second parallel data signal between the successive synchronization signals in the form of a single packet or several packets subsequently to the packet of the first parallel data signal.

14. The system of claim 13, wherein the serializer generates the serial clock signal independent from the clock signals based on the reference clock signal even when the clock signals are temporarily interrupted.

15. The system of claim 13, wherein the serializer comprises a PLL (phase locked loop) for generating the serial clock signal.

16. The system of claim 13, wherein the first parallel data signal is a video data signal that has the synchronization signal and to be transmitted in synchronization with the synchronization signal.

17. The system of claim 13, wherein the serial data signal outputted from the serializer includes the synchronization signal for representing a constant data transmission period.

18. The system of claim 17, wherein a serial transmission of the first and second parallel data signals is initiated when the synchronization signal is generated, and is completed before the synchronization signal is generated again.

19. The system of claim 13, wherein after transmission of the second parallel data signal, a length of the second parallel data packet is adjusted to transmit the next synchronization signal without delay, to secure a marginal time until the next synchronization signal is inputted, after transmission of the second parallel data packet is completed.

20. The system of claim 19, wherein an omitted data signal among the second parallel data signal is transmitted after the successive synchronization signals.

21. The system of claim 20, wherein the parallelizer includes a register for storing information about the given clock signal, the synchronization signal and a valid period of a data signal.

22. The system of claim 21, wherein the register individually stores a data signal corresponding to each data signal contained in the serial data signal.

23. The system of claim 22, wherein the parallelizer individually recovers the parallel data signal, the parallel clock signal, and the synchronization signal from the serial data signal by using a value stored in the register.

24. The system of claim 23, wherein the parallelizer receives the serial data signal and the serial clock signal and recovers a third parallel data signal and a third clock signal identical to the first parallel data signal, a fourth parallel data signal and a fourth clock signal identical to the second parallel data signal, and the synchronization signal using information stored by the register.

25. The system of claim 24, wherein the third parallel data signal is generated using clock data stored in the register, and the third clock signal is corrected upon an activation of the synchronization signal, wherein a frequency difference is substantially prevented from accumulating between a clock signal of the first parallel data signal and the third clock signal.

26. A method for serially transmitting data from a system including a serializer for converting a parallel data signal into a serial data signal and a parallelizer for converting the serial data signal into the parallel data signal, the method comprising:
  storing a value of the parallel data signal in a register in the parallelizer;
  generating a serial clock signal independent from a clock signal of the parallel data signal using an external clock source; and
  recovering the parallel data signal by using the value of the parallel data signal stored in the register,
  wherein when a first parallel data signal and a second parallel data signal in synchronization with different clock frequencies are inputted into the serializer, the serializer generates a serial clock signal having a bandwidth being able to transfer the first and second parallel data on the basis of the different clock frequencies so that the first and second parallel data signals are transmitted in the serial data signal,
  wherein the second parallel data signal is a data signal that has no synchronization signal and is to be transmitted within a predetermined duration, and
  wherein the serializer transmits a synchronization signal in a single packet and transmit the first parallel data signal between successive signals in the form of a single packet or several packets, and transmits the second parallel data signal between the successive synchronization signals in the form of a single packet or several packets subsequently to the packet of the first parallel data signal.

27. The method of claim 26, wherein the register stores values corresponding to a given clock signal, the synchronization signal and a valid period of a data signal of the parallel data signal.

28. The method of claim 26, wherein the serial clock signal is generated such that the parallel data signal inputted into the serializer is transmitted in the form of the serial data signal.

* * * * *